United States Patent
Li et al.

(10) Patent No.: US 11,194,160 B1
(45) Date of Patent: Dec. 7, 2021

(54) HIGH FRAME RATE RECONSTRUCTION WITH N-TAP CAMERA SENSOR

(71) Applicant: Facebook Technologies, LLC, Menlo Park, CA (US)

(72) Inventors: Fengqiang Li, Redmond, WA (US); Zihe Gao, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 38 days.

(21) Appl. No.: 16/748,510

(22) Filed: Jan. 21, 2020

(51) Int. Cl.
*G02B 27/01* (2006.01)
*G02B 27/10* (2006.01)
*H04N 5/225* (2006.01)

(52) U.S. Cl.
CPC ..... *G02B 27/0172* (2013.01); *G02B 27/1066* (2013.01); *G02B 2027/0138* (2013.01); *G02B 2027/0178* (2013.01); *H04N 5/2257* (2013.01)

(58) Field of Classification Search
CPC .............. H04N 5/2257; G02B 27/0172; G02B 27/1066; G02B 2027/0138; G02B 2027/0178
See application file for complete search history.

(56) References Cited

U.S. PATENT DOCUMENTS

| | | | |
|---|---|---|---|
| 5,016,282 A | 5/1991 | Tomono et al. |
| 5,564,417 A | 10/1996 | Chance |
| 8,311,286 B2 | 11/2012 | Masuda et al. |
| 8,569,671 B2 | 10/2013 | Meynants et al. |
| 8,824,779 B1 | 9/2014 | Smyth |
| 9,127,942 B1 | 9/2015 | Haskin et al. |
| 9,555,589 B1 | 1/2017 | Ambur et al. |
| 9,581,744 B1 | 2/2017 | Yun et al. |
| 9,581,827 B1 | 2/2017 | Wong et al. |
| 9,737,209 B2 | 8/2017 | Gramatikov et al. |

(Continued)

FOREIGN PATENT DOCUMENTS

WO    WO 2013/066634 A1    5/2013

OTHER PUBLICATIONS

Holloway, J. et al. "Flutter Shutter Video Camera for Compressive Sensing of Videos." 2012 IEEE International Conference on Computational Photography (ICCP), Apr. 28-29, 2012, pp. 1-9.

(Continued)

*Primary Examiner* — Lin Ye
*Assistant Examiner* — John H Morehead, III
(74) *Attorney, Agent, or Firm* — Fenwick & West LLP

(57) ABSTRACT

A camera captures image data at a target frame rate. The camera includes a sensor and a controller. The sensor is configured to detect light from a local area and includes a plurality of augmented pixels. Each augmented pixel comprises at least a first and a second gate. The first gates are configured to store a first plurality of image frames as first image data according to a first activation pattern. The second gates are configured to store a second plurality of image frames as second image data according to a second activation pattern. The controller reads out the image data to generate a first image from the first image data and a second image from the second image data. The first and second images may be used to reconstruct a combined set of image frames at the target frame rate with a reconstruction algorithm.

20 Claims, 11 Drawing Sheets

(56) References Cited

U.S. PATENT DOCUMENTS

| | | |
|---|---|---|
| 9,829,710 B1 | 11/2017 | Newell et al. |
| 9,835,777 B2 | 12/2017 | Ouderkirk et al. |
| 10,108,261 B1 * | 10/2018 | Hall .................. G01S 17/66 |
| 10,146,055 B2 | 12/2018 | Ouderkirk |
| 10,229,943 B2 | 3/2019 | Genov et al. |
| 10,902,623 B1 * | 1/2021 | Li .................. G01B 11/22 |
| 2006/0239558 A1 | 10/2006 | Rafii et al. |
| 2007/0058038 A1 | 3/2007 | David et al. |
| 2007/0091175 A1 | 4/2007 | Iddan et al. |
| 2007/0146682 A1 | 6/2007 | Tachino et al. |
| 2009/0021621 A1 | 1/2009 | Hashimoto et al. |
| 2009/0135263 A1 | 5/2009 | Sorek et al. |
| 2010/0188491 A1 | 7/2010 | Shizukuishi |
| 2011/0050885 A1 | 3/2011 | McEldowney |
| 2011/0090385 A1 | 4/2011 | Aoyama et al. |
| 2011/0134298 A1 | 6/2011 | Aoyama |
| 2012/0075432 A1 | 3/2012 | Bilbrey et al. |
| 2012/0082346 A1 | 4/2012 | Katz et al. |
| 2012/0154467 A1 | 6/2012 | Hwang et al. |
| 2012/0274744 A1 | 11/2012 | Wan et al. |
| 2012/0314124 A1 | 12/2012 | Kaizu et al. |
| 2012/0320219 A1 | 12/2012 | David et al. |
| 2013/0135486 A1 | 5/2013 | Wan |
| 2013/0181119 A1 | 7/2013 | Bikumandla et al. |
| 2014/0118397 A1 | 5/2014 | Lee et al. |
| 2014/0285429 A1 | 9/2014 | Simmons |
| 2015/0193920 A1 | 7/2015 | Knee et al. |
| 2016/0065866 A1 | 3/2016 | Hsu |
| 2016/0086379 A1 | 3/2016 | Sadi et al. |
| 2016/0127715 A1 | 5/2016 | Shotton et al. |
| 2016/0147408 A1 | 5/2016 | Bevis et al. |
| 2016/0202484 A1 | 7/2016 | Ouderkirk |
| 2016/0225154 A1 | 8/2016 | Zhou et al. |
| 2016/0324580 A1 | 11/2016 | Esterberg |
| 2016/0334508 A1 | 11/2016 | Hall et al. |
| 2016/0344965 A1 | 11/2016 | Grauer et al. |
| 2016/0373672 A1 | 12/2016 | Liu |
| 2017/0065240 A1 | 3/2017 | Zou et al. |
| 2017/0115393 A1 | 4/2017 | Nagai et al. |
| 2017/0115395 A1 | 4/2017 | Grauer et al. |
| 2017/0180703 A1 * | 6/2017 | Kovacovsky .......... G01S 17/46 |
| 2017/0180713 A1 | 6/2017 | Trail |
| 2017/0192499 A1 | 7/2017 | Trail |
| 2017/0195653 A1 | 7/2017 | Trail et al. |
| 2017/0206660 A1 | 7/2017 | Trail |
| 2017/0276789 A1 | 9/2017 | Ikeno et al. |
| 2017/0323455 A1 | 11/2017 | Bittan et al. |
| 2018/0038944 A1 | 2/2018 | Hellmig et al. |
| 2018/0063390 A1 | 3/2018 | Trail |
| 2018/0063442 A1 | 3/2018 | Mäkelä et al. |
| 2018/0100731 A1 | 4/2018 | Pau |
| 2018/0102386 A1 | 4/2018 | Kobayashi et al. |
| 2018/0124299 A1 | 5/2018 | Brook |
| 2018/0124372 A1 | 5/2018 | Yang et al. |
| 2018/0135980 A1 | 5/2018 | Nakamura et al. |
| 2018/0143302 A1 | 5/2018 | Osiroff et al. |
| 2018/0196509 A1 | 7/2018 | Trail |
| 2018/0227567 A1 | 8/2018 | Chao et al. |
| 2018/0239146 A1 | 8/2018 | Bierhuizen et al. |
| 2018/0278910 A1 | 9/2018 | Schoenberg et al. |
| 2018/0288343 A1 * | 10/2018 | McCarten .......... H04N 5/3592 |
| 2018/0299554 A1 | 10/2018 | Van Dyck et al. |
| 2018/0376090 A1 * | 12/2018 | Liu .................. H04N 5/3575 |
| 2019/0033070 A1 | 1/2019 | Murakami |
| 2019/0162852 A1 | 5/2019 | Kim et al. |
| 2019/0181171 A1 | 6/2019 | Tadmor et al. |
| 2019/0342485 A1 | 11/2019 | Lee |
| 2019/0361123 A1 * | 11/2019 | Miyazaki .............. G01S 7/4911 |
| 2020/0096640 A1 | 3/2020 | Atanassov et al. |
| 2020/0259989 A1 * | 8/2020 | Li .................. H04N 5/2353 |
| 2020/0260021 A1 * | 8/2020 | Li .................. H04N 5/2256 |

OTHER PUBLICATIONS

Kadambi, A. et al., "Polarized 3D: High-Quality Depth Sensing with Polarization Cues," The IEEE International Conference on Computer Vision (ICCV), 2015, pp. 3370-3378.

PCT International Search Report and Written Opinion, PCT Application No. PCT/US2018/040771, Nov. 16, 2018, 20 pages.

Raskar, R. et al. "Coded Exposure Photography: Motion Deblurring using Fluttered Shutter." SIGGRAPH '06: ACM SIGGRAPH 2006, Jul. 2006, pp. 795-804.

United States Office Action, U.S. Appl. No. 16/219,502, dated Apr. 2, 2020, 22 pages.

Yahav, G. et al., "A Low Cost 3D Tracker for Parallax Barrier Display," 2007 3DTV Conference, May 2007, pp. 1-4.

Final Office Action dated May 12, 2020 for U.S. Appl. No. 16/219,511, filed Dec. 13, 2018, 14 pages.

* cited by examiner

805

Reconstruct sets of image frames at a target frame rate by applying a reconstruction algorithm to each image generated from the plurality of taps
850

Generate a combined set of image frames at the target frame rate by aggregating the sets of image frames
860

HIGH FRAME RATE RECONSTRUCTION WITH N-TAP CAMERA SENSOR

FIELD OF THE INVENTION

This disclosure relates generally to high frame rate cameras, and more particularly high frame reconstructions using data from an N-tap camera sensor.

BACKGROUND

Digital cameras generally comprise a camera sensor with some optics that focuses light onto the camera sensor. A frame rate by which a camera captures video is typically limited by the hardware of the camera sensor. The limitations typically are a shutter speed and a read-out rate. More limiting of the two is typically the read-out rate, i.e., speed at which a camera processor can read out stored local image data by each pixel of the camera sensor.

SUMMARY

A camera captures image data at a target frame rate, which may be a high frame rate. The camera includes a sensor and a controller. The sensor is configured to detect light from a local area and includes a plurality of augmented pixels. Each augmented pixel comprises at least a first and a second gate. Each of the first gate and the second gate have a respective storage location. The first gates are configured to store a first plurality of image frames at first respective storage locations as first local image data according to a first activation pattern. The second gates are configured to store a second plurality of image frames at second respective storage locations as second local image data according to a second activation pattern. The controller reads out the local image data to generate a first image from the first local image data and a second image from the second local image data. The first image and the second image are coded exposure images. A combined set of image frames at the target frame rate is extracted from the first image and the second image using a reconstruction algorithm, the first activation pattern, and the second activation pattern.

A method is further disclosed for capturing multiple coded exposure images with a N-tap camera. The method includes detecting light with a sensor of the camera including a plurality of augmented pixels, wherein each augmented pixel comprises a first gate having a first respective local storage location and a second gate having a second respective local storage location. The method includes storing a first plurality of image frames as first local image data in the first respective local storage locations of the augmented pixels according to a first activation pattern. The method includes storing a second plurality of image frames as second local image data in the second respective local storage locations of the augmented pixels according to a second activation pattern. The method includes reading out local image data stored in the respective storage locations of the augmented pixels to generate a first image using the first local image data and a second image using the second local image data. A combined set of image frames at the target frame rate is extracted from the first image and the second image using a reconstruction algorithm, the first activation pattern, and the second activation pattern. In some embodiments, the method may be implemented via a non-transitory computer-readable storage medium storing instructions for performing the method.

A method is further disclosed for generating high frame rate video with multiple coded exposure images captured with a N-tap camera sensor. The method includes reconstructing a first set of image frames at a target frame rate by applying a reconstruction algorithm to a first image generated with first local image data stored in first respective local storage locations of augmented pixels of a sensor. The method includes reconstructing a second set of image frames at a target frame rate by applying the reconstruction algorithm to a second image generated with second local image data stored in second respective local storage locations of the augmented pixels of the sensor. The method includes generating a combined set of image frames at the target frame rate by aggregating the first set of image frames and the second set of image frames. In some embodiments, the method may be implemented via a non-transitory computer-readable storage medium storing instructions for performing the method.

Figure 1:
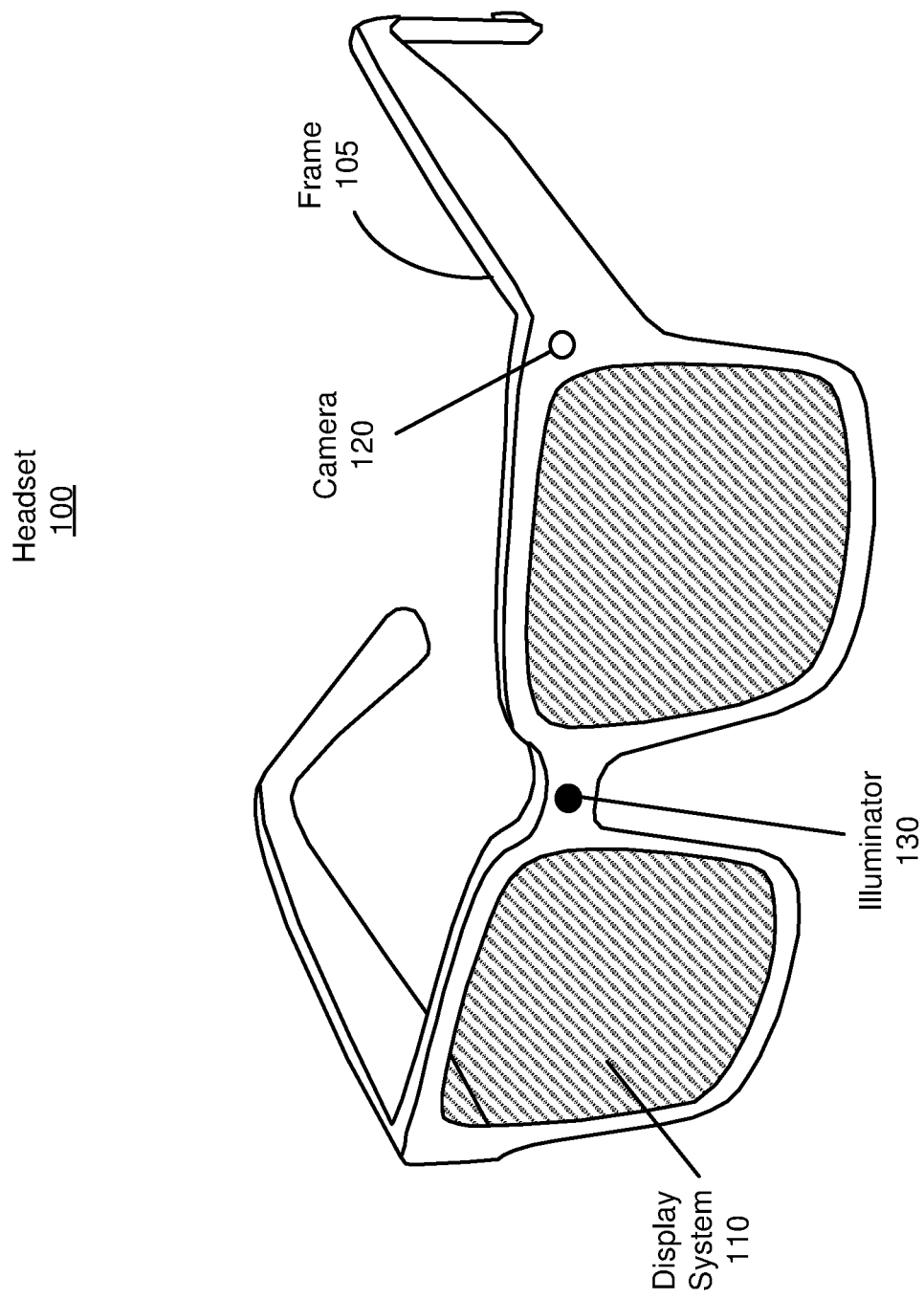
FIG. 1 is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A camera that can capture high frame rate video comprises a N-tap camera sensor and controller. The camera sensor includes an array of augmented pixels, wherein each augmented pixel comprises a detector and a plurality of gates. One or more of the gates for an augmented pixel has their own respective local storage location. Each tap generally corresponds is configured to store local image data collected from the gates of the augmented pixels, the gates included in the tap. For example, in a 2-tap case, each augmented pixel has at least two gates, a first gate and a second gate. All first gates of the augmented pixels correspond to a first tap and all second gates of the augmented pixels correspond to a second tap. For each tap, the gates corresponding to that tap are configured to store a plurality of image frames as local image data in the respective storage locations of the gates according to an activation pattern. The activation pattern is denoted as a pattern of some length inclusive of one or more capture intervals dictating when a gate is activated to store local image data according to light detected by the detector. The activation pattern has a sampling frame rate which is lower than a target frame rate. The target frame rate is selected from a range of frame rates that a camera system can achieve, including high frame rates. The controller reads out the local image data stored in the respective storage locations to generate an image for each tap. In effect, each tap captures a coded exposure image, determined by the activation pattern, which encodes a plurality of detected image frames in a single image, thereby decreasing size of the image data from what would have been multiple images into a single image.

The controller generates video at a target frame by reconstruction of the coded exposure images captured by the N-tap camera sensor. For each coded exposure image, the controller extracts a set of image frames at the target frame rate by applying a reconstruction algorithm to a coded exposure image and a corresponding activation pattern used by the tap that captured the coded exposure image. The controller combines the sets of image frames extracted with the reconstruction algorithm to generate the video at the target frame rate, i.e., a combined set of image frames at the target frame rate. The target frame rate is higher than any of the sampling frame rates for the various activation patterns. In some embodiments, another external system may generate the video at the target frame rate. In these embodiments, the camera controller transmits the coded exposure images to the external system.

Advantages of this camera system include high signal throughput, fast frame rate, and fast read out and data management. The camera system relies on a N-tap camera sensor, wherein each tap stores light detected by the camera sensor according to respective activation patterns. On the other hand, a conventional (i.e., does not include a N-tap camera sensor) camera operating as a flutter shutter only has one gate with a respective storage location per augmented pixel. The activation pattern for the flutter shutter operation of a single tap includes one or more capture intervals dictating when the gates of the single tap stores local image data. Outside of capture intervals, signal, i.e., light detected by the detector of the single-tap camera, is lost. Compared to the single tap camera operating as a flutter shutter, the N-tap camera maintains high signal throughput as the activation patterns for each tap can convert more of the detected light into usable signal, that would be typically lost by the single-tap camera. Moreover, with multiple taps, each tap's exposure is adjustable providing greater flexibility in activation patterns among the various taps compared to a single tap camera. The camera system is also advantageous in providing fast frame rate capabilities through the use of reconstruction algorithms on the coded exposure images.

Moreover, capturing coded exposure images improves camera read out timing and also saves on data management. Compared to reading out each and every captured frame at a high capture rate, the camera saves time by collecting multiple image frames as a coded exposure requiring a less frequent read out. Similarly managing coded exposure images compared to each individual image frame compacts the image data, proving beneficial in limited communication bandwidth.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1 is a perspective view of a headset 100 implemented as an eyewear device, in accordance with one or more embodiments. As an eyewear device, generally, the headset 100 is worn on the face of a user as like a pair of eyeglasses. Content is presented to the user with the headset 100. Examples of content presented by the headset 100 include visual content, audio content, and haptic feedback content. The visual content may further comprise one or more images, video, or a combination thereof. Moreover, the visual content may include some amount of virtually generated content. The headset 100 includes a frame 105, a display system 110, and a camera 120. In other embodiments, the headset 100 may include additional components, including but not limited to an illuminator 130, an audio system for presenting audio content, a haptic feedback system for presenting haptic feedback content, a position sensor for tracking a position of the headset 100, etc. Moreover, although FIG. 1 illustrates the components of the headset 100 in example locations on the headset 100, the components may be otherwise located on the headset 100, on a peripheral device paired with the headset 100, or some combination thereof.

The frame 105 is a rigid body that holds one or more other components of the headset 100. The frame 105 includes one or more optical elements which together display media to users. The display system 110 is configured for users to see the content presented by the headset 100. The display system 110 generates an image light to present media to one or more eyes of the user. The display system 110 may be transmissive to some degree to allow light from the environment reach one or more eyes of the user. In these embodiments, the display system 110 may generate visual content that augments what the user sees from the environment.

The headset 100 further includes a camera 120 configured to image a portion of a local area surrounding some or all of the headset 100. The camera 120, according to this present disclosure, is configured to capture high frame rate video data. The camera 120 includes at least one or more optical elements, a N-tap camera sensor, and a controller. The one or more optical elements focus the incoming light onto the N-tap camera sensor which converts the detected light into local image data. The controller reads out the local image data from the camera sensor into general image data. From the general image data, the controller (or another external system) may extract video at a target frame rate. In other embodiments, the camera 120 is further implemented as a depth camera assembly (DCA) for depth estimation and/or tracking. Position of the camera 120 within the headset 100 shown in FIG. 1 is only illustrative. As such, the camera 120 can be located elsewhere on the frame 105, e.g., on any temple of the frame 105. The camera 120 and its operation will be further described in FIGS. 4-8B.

In embodiments with the illuminator 130, the illuminator 130 illuminates a portion of the local area with light. The light may be, e.g., structured light (e.g., dot pattern, bars, etc.) in the infrared (IR), IR flash for time-of-flight, etc. In some embodiments, images captured by the camera 120 are illumined by light emitted from the illuminator 130 thereby improving signal in the captured image data. The illuminator 130 may have an illumination pattern dictating illumination by the illuminator 130. For example, the illumination pattern can be continuous or pulsed, of a constant or varying wavelength, amplitude, and/or duration, etc. The illumination pattern may further be adjusted according to activation patterns for the taps in the camera 120. Position of the illuminator 130 on the headset 100 shown in FIG. 1 is only illustrative. As such, the illuminator 130 can be located elsewhere on the frame 105, e.g., on any temple of the frame 105. In some embodiments, the illuminator 130 is further implemented as a depth camera assembly (DCA) for depth estimation and/or tracking. Depth determination techniques may include, e.g., direct time-of-flight (ToF) depth sensing, indirect ToF depth sensing, structured light, passive stereo analysis, active stereo analysis (uses texture added to the scene by light from the illuminator 130), some other technique to determine depth of a scene, or some combination thereof.

In some embodiments, data captured by the camera 120 (e.g., image data, depth information, tracking data, etc.) may be stored locally by the camera 120 (or the headset 100) or transmitted to an external system (e.g., a console coupled to the headset 100). In embodiments of storing or transmitting coded exposure images, there is the added benefit in bandwidth efficiency compared to storing and transmitting high frame rate video. This benefit is achieved because a coded exposure image encoding multiple image frames is of a smaller file size compared to multiple image frames as separate images. In embodiments where the image data is transmitted to the console, the console is configured to generate visual content for presentation on the display system 110 of the headset 100, based on the image data and/or the depth information. The visual content may include high frame rate video extracted by the camera 120 or the console. The visual content provided may also include some amount of generated virtual content that is used to augment the image data collected by the camera 120.

Figure 2:
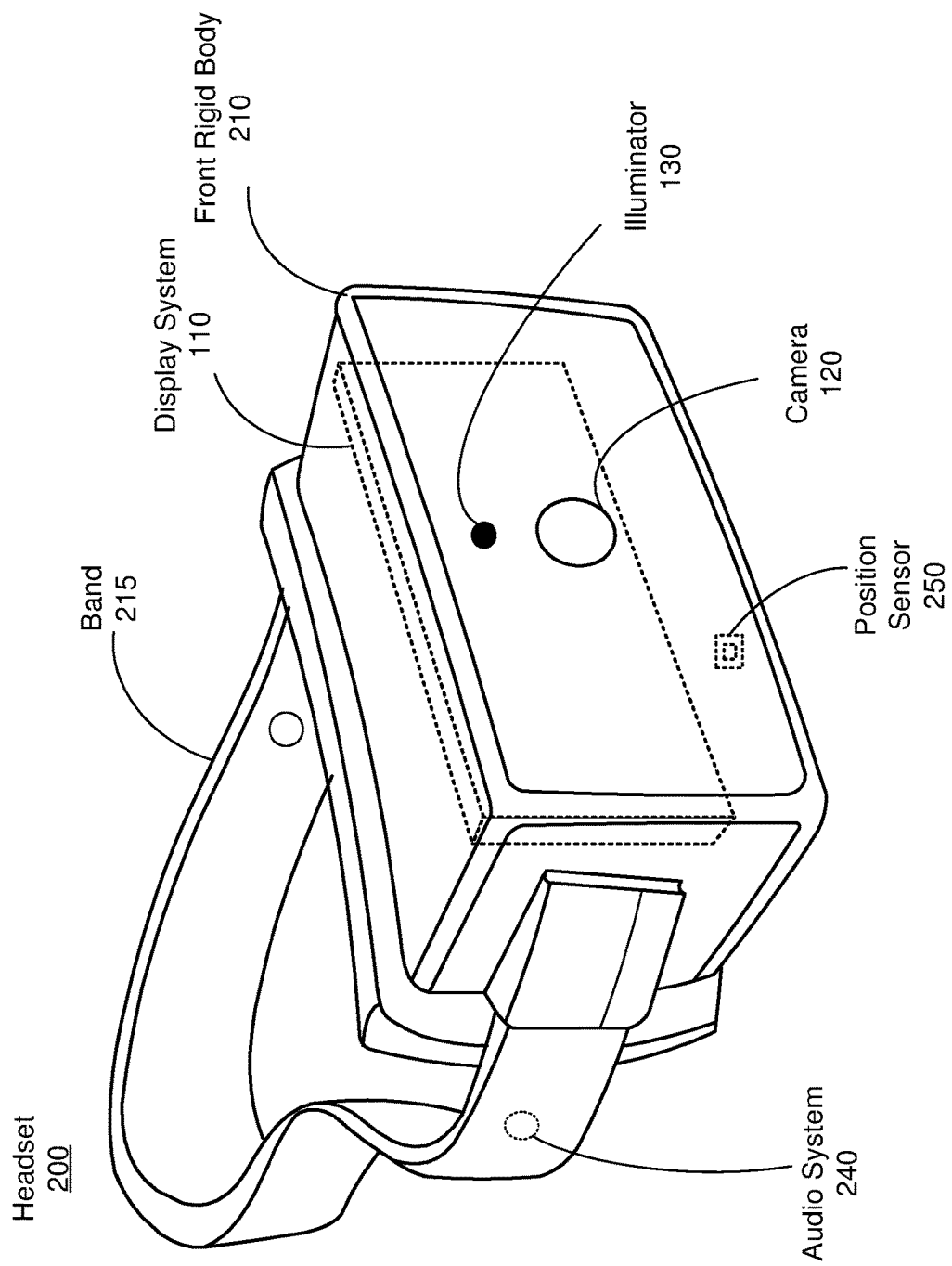
FIG. 2 is a perspective view of a headset implemented as a head-mounted display, in accordance with one or more embodiments.

FIG. 2 is a perspective view of a headset 200 implemented as a head-mounted display (HMD), in accordance with one or more embodiments. In general, the headset 200 may be worn on the face of a user such that content (e.g., media content) is presented using a display assembly and/or an audio system. However, the headset 200 may also be used such that media content is presented to a user in a different manner. Examples of media content presented by the headset 200 include one or more images, video, audio, or some combination thereof. The headset 200 includes a front rigid body 210, a band 215, a display system 110, a camera 120, an illuminator 130, an audio system 240, and a position sensor 250. While FIG. 2 illustrates the components of the headset 200 in example locations on the headset 200, the components may be located elsewhere on the headset 200, on a peripheral device paired with the headset 200, or some combination thereof. Similarly, there may be more or fewer components on the headset 200 than what is shown in FIG. 2.

The front rigid body 210 holds one or more of the components of the headset 200. The front rigid body 210 couples to a user's face around the user's eyes. The front rigid body 210 has a front side that is an exterior surface of the front rigid body 210 directed away from the user's body when the headset 200 is worn. The front rigid body 210 holds within the display system 210, such that the display system 210 can provide visual content to the user's eyes. The front rigid body 210 may also the hold the camera 230, which may be placed on the exterior device so as to capture image data in front of the user. The front rigid body 210 may also hold the audio system 240 and its various components, such as one or more speakers, one or more acoustic sensors, and an audio controller. Moreover, the position sensor 250 may be placed on the front rigid body 210. The front rigid body 210 is attached to the band 215 which can be used to hold the front rigid body 210 to the user's face when the headset 200 is being worn by the user. The band 215 can be constructed by an elastic material providing sufficient force to hold the front rigid body 210 to the user's face.

The display system 110 provides visual content. The display system 110 has, among other components, an electronic display and an optics block (not shown). The electronic display generates image light according to visual content rendered to be presented to the user. The optics block directs the image light to an eye-box of the headset 200 where a user's eyes would be located when the headset 200 is properly worn. The eye-box is a location in space that an eye of user occupies while wearing the headset 200. In one implementation, the display system 110 may be implemented as a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eye-box of the headset 200. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. The display system 110 may comprise other optical elements for various purposes, e.g., focusing of light, correcting for aberrations and/or distortions, magnifying light, directing light from an environment, etc. The display system 110 will be discussed in greater detail in FIG. 9.

The camera 120 captures image data of a local area of the headset 200. Although FIG. 2 places the camera 120 on the exterior of the front rigid body 210 facing forward or towards the local area in front of the headset 200, the camera 120 may be located otherwise. In other embodiments, the headset 200 may have additional cameras 120, for capturing images all around the headset 200. The camera 120, according to this present disclosure, is configured to capture high frame rate video data. In other embodiments, the camera 120 is further implemented as a depth camera assembly (DCA) for depth estimation and/or tracking. The camera 120 and its operation will be further described in FIGS. 4-8B.

The audio system 240 provides audio content. The audio system 240 includes one or more speakers, and one or more acoustic sensors, and an audio controller. However, in other embodiments, the audio system may include different and/or additional components. Similarly, in some cases, functionality described with reference to the components of the audio system can be distributed among the components in a different manner than is described here. The speakers include a plurality of transducers configured to present sound to a user. A transducer is a device that generates vibrations detectable by a cochlea in a user's ears. The speakers are shown on the band 215 in FIG. 2 but may also be placed on the front rigid body 210. The acoustic sensors detect sounds within the local area of the headset 200. An acoustic sensor captures sounds emitted from one or more sound sources in the local area (e.g., a room). The acoustic sensors may be acoustic wave sensors, microphones, sound transducers, or similar sensors that are suitable for detecting sounds. The audio controller processes information from the acoustic sensors that describes detected sounds. The audio controller may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 260, or some combination thereof. Moreover, the audio controller may generate and/or update audio content provided to the speakers, e.g., based on audio content to be presented, or based on sounds detected by the acoustic sensors.

The position sensor 250 generates one or more measurement signals in response to motion of the headset 200. The position sensor 250 may be located on a portion of the front rigid body 210 of the headset 200. The position sensor 250 may include an inertial measurement unit (IMU). Examples of position sensor 250 include: one or more accelerometers, one or more gyroscopes, one or more magnetometers, another suitable type of sensor that detects motion, a type of sensor used for error correction of the IMU, or some combination thereof. The position sensor 250 may be located external to the IMU, internal to the IMU, or some combination thereof. Additional details regarding the components of the headset 200 are discussed below in connection with FIG. 9.

Figure 3:
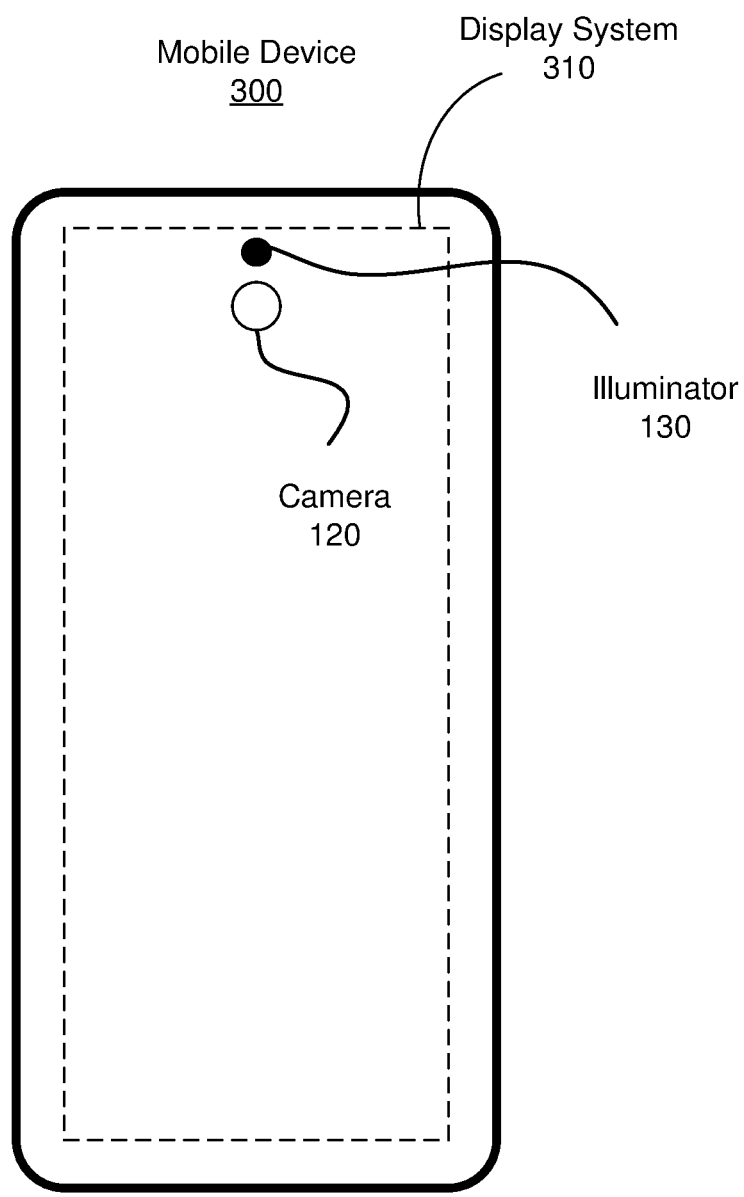
FIG. 3 is a frontal view of a mobile device, in accordance with one or more embodiments.

FIG. 3 is a frontal view of a mobile device 300, in accordance with one or more embodiments. The mobile device 300 can be a hand-held device for communicating with others, e.g., via audio, video, social networking, etc. In additional embodiments, the mobile device 300 may present content to a user, e.g., playing a movie. The mobile device 300 includes at least the display system 110 and the camera 120. The display system 110 is configured to present visual content. The display system 110 generates image light to present media to one or more eyes of the user. The mobile device 300 may further include the illuminator 130. While FIG. 3 illustrates the components of the mobile device 300 in example locations, the components may be located elsewhere on the mobile device 300. There may also be more or fewer components on the mobile device 300 than what is shown in FIG. 3.

The camera 120 is configured to image a portion of a local area surrounding some or all of the mobile device 300. The camera 120, according to this present disclosure, is configured to capture high frame rate video data. The camera 120 may provide the high frame rate video data to an external server, e.g., uploading a video to a social networking system or a cloud storage system. Position of the camera 120 on the mobile device 300 shown in FIG. 3 is only illustrative. The camera 120 and its operation will be further described in FIGS. 4-8B.

Figure 4:
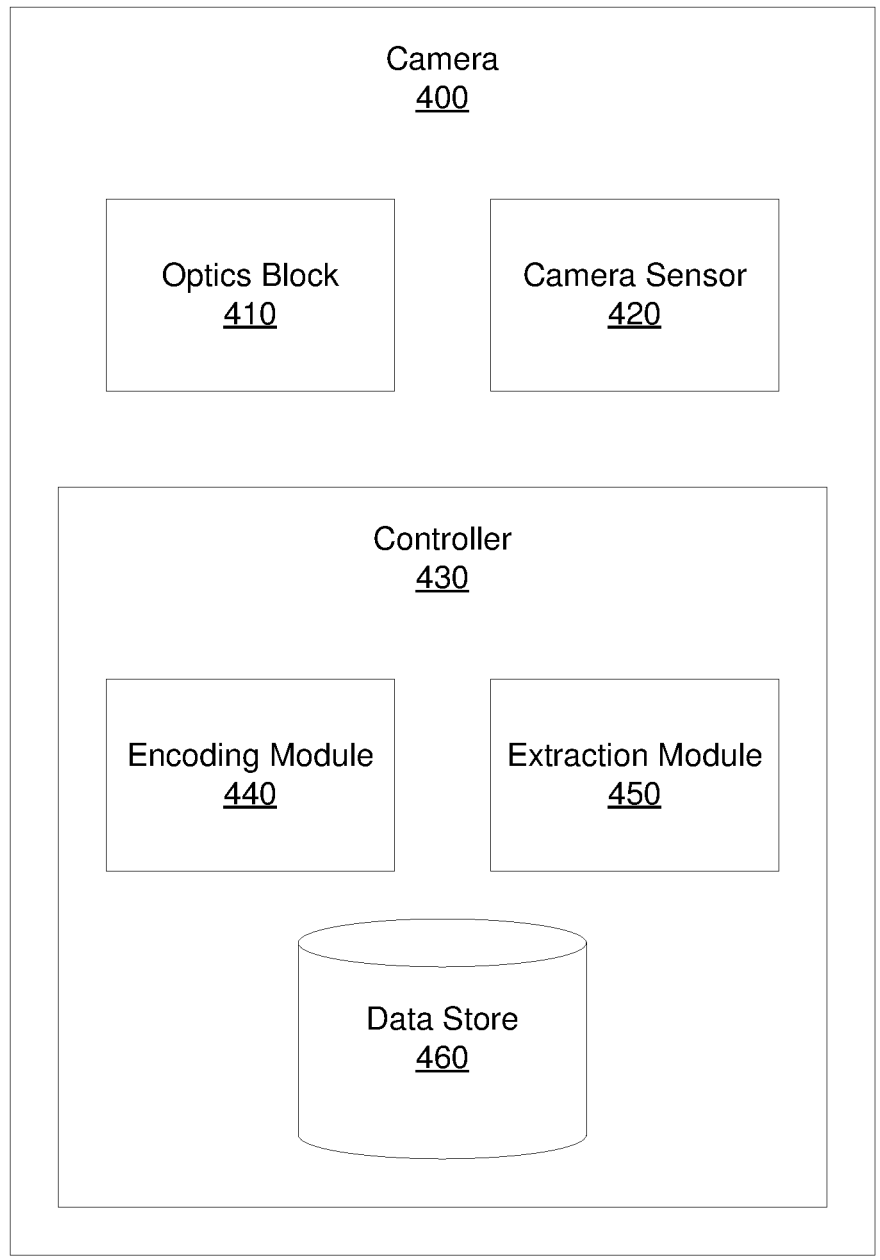
FIG. 4 is a system architecture for a camera, in accordance with one or more embodiments.

FIG. 4 is a system architecture for a camera 400, in accordance with one or more embodiments. The camera 400 can capture image data. The image data may include high frame rate video or may include coded exposure images used to generate high frame rate video. The camera 400 includes an optics block 410, a camera sensor 420, and a controller 430. The controller 430 comprises an encoding module 440, an extraction module 450, and a data store 460. In some embodiments, the controller 430 lacks the extraction module 450 as extracting of the high frame rate video with coded exposure images is accomplished by an external system. The data store 460 stores data used by and/or generated by the camera 400. The camera 400 may include additional or fewer components than those listed herein. Camera 120 is an embodiment of the camera 400.

The optics block 410 directs light from an environment to the camera sensor 420. The optics block 410 includes one or more optical elements use to condition the incoming light. Example optical elements include a mechanical shutter, lenses, filters, polarizers, etc. A mechanical shutter opens and closes an aperture which is an opening that allows light to hit the camera sensor 420. An electronic shutter electrically controls whether light detected by the camera sensor 420 is converted into local image data. In an open position, light can enter the aperture, while in a closed position, light cannot enter the aperture. Lenses focus light providing for varying amounts of magnification. Filters filter light allowing light with particular wavelengths on the electromagnetic spectrum to transmit through them. Example filters include color filters, infrared filters, ultraviolet filters, etc. Polarizers polarize the light, e.g., to be linear, circular, etc.

The camera sensor 420 detects light and stores the detected light as local image data. The camera sensor 420 is implemented as a N-tap sensor, meaning that the camera sensor 420 comprises multiple taps. The camera sensor 420 includes an array of augmented pixels, wherein each augmented pixel comprises a detector and a plurality of gates with their own respective local storage locations. Each tap includes a gate from each augmented pixel. The tap is configured to capture local image data collected from the gates of the augmented pixels, the gates included in the tap. The use of multiple taps is an advantage in retaining high signal (light throughput) compared to a flutter shutter camera with a single tap used to produce the coded exposure image. Moreover, as each tap has its own activation pattern, multiple taps provides more flexibility in adjusting the activation patterns compared to a single tap camera. The camera sensor 420 may include circuitry for an electronic shutter which selectively turns on and off collection of local image data by the gates of the augmented pixels. The camera 400 may use a mechanical shutter, an electronic shutter, or a combination of both.

Each tap is configured to store detected light as local image data in the respective local storage locations of the gates included in the tap according to an activation pattern specific to the tap. Between the various activation patterns of the multiple taps, at any given time only a single tap may be activated to store local image data from light detected by the camera sensor. At the broadest level, an activation pattern comprises one or more capture intervals where detected light is stored in a respective local storage location for a gate of an augmented pixel. The number of capture intervals over the length of the activation pattern defines a sampling frame rate of the activation pattern which is lower than the target frame rate. In some embodiments, the activation pattern comprises pseudo-randomly dispersed capture intervals, i.e., no set frequency. Other embodiments have activation pattern capture intervals occurring periodically. Moreover, each capture interval has an associated duration defined as an exposure. The capture intervals in an activation pattern may have uniform exposure lengths or may have exposure lengths that differ. Each capture interval is effectively an exposure captured by a tap, wherein multiple capture intervals in an activation pattern yield (when read out) a coded exposure image. There is a tradeoff in signal to maximum frame rate achievable due to the length of the exposure. A longer exposure yields higher signal during a frame beneficial during reconstruction but limits the maximum frame rate achievable by the camera 400. For example, an exposure length of 5 milliseconds (ms) limits achievable target frame rate to 200 frames per second (fps). On the other hand, an exposure length of 0.2 ms can achieve a target frame rate of up to 5,000 fps.

In some embodiments, the activation patterns of all the taps are of the same length. The activation patterns of the taps are of the same length such that the controller 430 reads out each tap at the same read-out frequency as the other taps. One or more activation patterns may also align, such that the activation patterns are temporally coincident. This results in the controller 430 reading out each tap during a same read out period. In other embodiments, the activation patterns may be offset such that the read out period of taps may occur at different times or simultaneous. Further, the activation patterns of the taps may complement each other such that throughout the duration of the activation pattern light detected by the detector of an augmented pixel is stored by one of the augmented pixel's gates. Utilizing complementing activation patterns optimizes signal throughput by the camera sensor 420. Compared to a conventional flutter shutter single-tap camera, with only a single tap, there is no other tap to complement the activation pattern of the single tap. In effect, the single-tap camera captures less signal compared to the camera 400.

Characteristics of the activation pattern affect the quality of the extracted video. One characteristic that affects the video quality is the number of capture intervals in an activation pattern. A large number of capture intervals increases the difficulty of extracting the high frame rate video, which may compromise on sharpness or noise in the image frames of the high frame rate video. However, a longer activation pattern can be advantageous in decreasing the data read-out frequency which further decreases a number of coded exposure images that would be used for extracting the high frame rate video. Less coded exposure images to extract the same high frame rate video would be beneficial in limited communication bandwidth. The activation pattern may be set according to various factors, including but not limited to lighting conditions, illuminator power, illuminator duty cycle, target frame rate, number of taps, communication bandwidth, desired image frame resolution, etc. Example activation patterns will be described in FIGS. 6A & 6B.

The encoding module 440 of the controller 430 reads out the stored local image data as coded exposure images. The encoding module 440 reads out the local image data stored in the respective local storage locations of the various gates for the augmented pixels. The encoding module 440 reads out local image data of a tap following completion of an activation pattern for the tap. For example, a first tap has all first gates of the augmented pixels storing a plurality of image frames as first local image data according to a first activation pattern. The encoding module 440 reads out the first local image data stored by the first gates as a first image (i.e., coded exposure image) following completion of the activation pattern by the first gates. The encoding module 440 reads out local image data of the other taps as well, in a similar fashion. Assuming the same read-out frequency of all taps, the controller 430 reads out "n" coded exposure images corresponding to the "n" number of taps. The rate at which the encoding module 440 reads out local image data, i.e., the read-out frequency, corresponds to the length of the activation pattern. Each image generated during read out is a coded exposure image, wherein the number of exposures corresponds to the number of capture intervals in the activation pattern. For example, an activation pattern with five capture intervals would result in a quintuple exposure image when read out. The encoding module 440 may store the coded exposure images in the data store 460 as general image data. In other embodiments, the encoding module 440 provides the coded exposure images to an external system for extraction of the high frame rate video.

In some embodiments, the encoding module 440 further determines an activation pattern for each tap. The controller 430 may receive instructions (e.g., from a user of the camera 400) to capture high frame rate video. The instructions may further specify one or more parameters of the high frame rate video, e.g., a spatial resolution, a target frame rate, a communication bandwidth limit, an ISO of the camera sensor 420, another camera parameter, etc. The encoding module 440 may determine the activation patterns for the taps according to the instructions received. For example, to achieve a frame rate of P fps, the encoding module 440 determines a sampling frame rate for the activation patterns of three taps to be approximately P/3 fps. In another example, the instructions specify a limited communication bandwidth such that the encoding module 440 determines longer activation patterns for the taps to accommodate the limited communication bandwidth. The encoding module 440 provides the activation patterns to the camera sensor 420 for capturing of image data according to the determined activation patterns. The encoding module 440 may further store the activation patterns in the data store 460.

In some embodiments, the extraction module 450 generates the high frame rate video by extracting image frames from the coded exposure images. For each coded exposure image, the extraction module 450 may apply a reconstruction algorithm to the coded exposure image with its corresponding activation pattern to extract a set of image frames. Reconstruction algorithms that may be used can generally be divided into two categories, compressed sensing algorithms and machine learning algorithms. The reconstruction algorithm may be tailored according to various factors, including but not limited to lighting conditions, target frame rate, number of taps, communication bandwidth, desired image frame resolution in high frame rate video, etc. The sets of image frames extracted from the coded exposure images can be combined by the extraction module 450 to generate the high frame rate video at the target frame rate. In one embodiment, the sets of image frames are summed to generate the high frame rate video. Combining the sets of image frames yields higher signal video frames at the target frame rate. The high frame rate video may be stored in the data store 460.

In alternative embodiments, the generation of the high frame rate video is performed offline (i.e., not real-time while capturing of the image data occurs), by an external system, or some combination of the camera 400 and the external system. One example of a combination of efforts has the camera 400 extracting the sets of image frames, whereas, the external system combines the sets of image frames. Performing the generation of the high frame rate video offline is that the camera 400 during real-time can store the coded exposure images which would be more compact data compared to the numerous sets of image frames. Similarly, having the external system perform the generation of the high frame rate video would allow for transmission of compact data proving beneficial with limited communication bandwidth.

Compressed sensing algorithms rely on optimization of the sparsity of the signal in the coded exposure images to reconstruct the set of image frames. As such, a random activation pattern increases sparsity of the signal thereby improving reconstruction via the compressed sensing algorithms. The compressed sensing algorithms typically cast the problem of reconstruction as the coded exposure image is a linear combination of the image frames (observed and unobserved). These algorithms weight the observed frames and impose the constraint that the signal is sparse. For example, let x be a high frame rate video of size N×M×T and let $x_t$ be the image frame of the video x captured at time t. N and M are integers describing the spatial dimensions of each image frame (e.g., in pixels), and T refers to the temporal resolution of the video (e.g., in frame rate or in number of frames). The image frames captured in the coded exposure image y can be defined in relation to the high frame rate video x to be reconstructed and the activation pattern S, optionally accounting for noise n, as follows: y=Sx+n. From this juncture, various other constraints may be considered. For example, a fast reconstruction algorithm that sacrifices on image frame resolution or detail can be implemented. Other examples include a robust reconstruction algorithm that prioritizes image frame resolution and denoising. Moreover, various implementations of solving the reconstruction problem include total variation regularization. Solving the reconstruction problem for x yields a set of image frames at a target frame rate from a coded exposure image captured according to a known activation pattern.

Machine learning approaches are trained to reconstruct a set of image frames from a coded exposure image. Machine learning algorithms may include convolutional neural network (CNN), regressions, classifiers, sparse dictionary learning, etc. The CNN is trained by inputting a coded exposure with known set of image frames that constitute the coded exposure. The controller 430 iteratively adjusts weights of the CNN, wherein the sufficiently trained CNN inputs a coded exposure image captured by the camera sensor 420 and outputs a set of image frames.

Figure 5A:
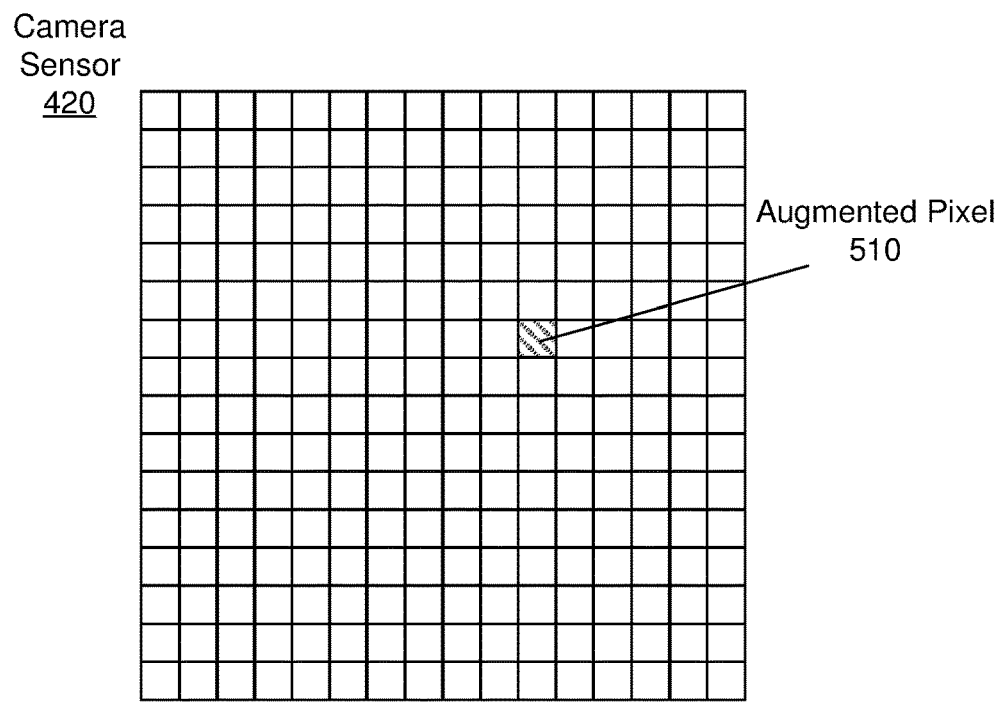
FIG. 5A is a close-up view of the camera sensor of FIG. 4, in accordance with one or more embodiments.

FIG. 5A is a close-up view of the camera sensor 420 of FIG. 4, in accordance with one or more embodiments. The camera sensor 420 may capture, via the augmented pixels 510, light from an environment of the camera 400. The light captured by the augmented pixels 510 of the camera sensor 420 may originate from light emitted by some other light source (e.g., of the headset 100) and reflected from the local area, may originate from ambient light of the local area, or some combination thereof. The augmented pixels 510 may be organized within the camera sensor 420 as a two-dimensional array of augmented pixels 510. While the camera sensor 420 illustrated in FIG. 5A is 16×16 sensor, in other embodiments the camera sensor 420 may have some other number of columns and/or rows. For example, the camera sensor 420 may be 4200×4000. The camera sensor 420 can be generally described as an N×M sensor having "N" rows of augmented pixels 510 and "M" columns of augmented pixels 510, where N and M are integers.

Figure 5B:
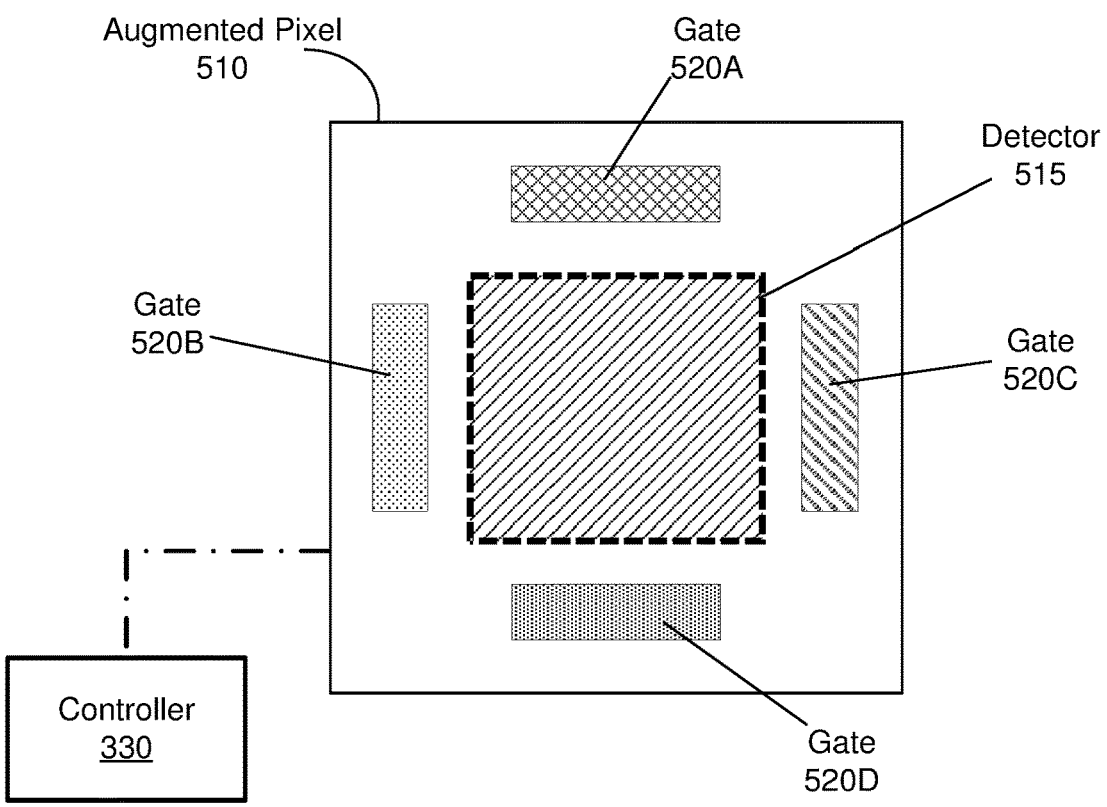
FIG. 5B is a close-up view of an augmented pixel of the camera sensor in FIG. 5A, in accordance with one or more embodiments.

FIG. 5B is a close-up view of an augmented pixel 510 of the camera sensor 420 in FIG. 5A, in accordance with one or more embodiments. The augmented pixel 510 captures, over multiple time intervals, intensities of light incident on a surface of the augmented pixel 510. The augmented pixel 510 includes a detector 515 and a plurality of gates, e.g., gates 520A, 520B, 520C, and 520D as shown in FIG. 5B. Although the augmented pixel 510 shown in FIG. 5B includes four gates, each augmented pixel 510 of the camera sensor 420 may include less than four gates (e.g., two gates) or more than four gates (e.g., four or five gates). In some embodiments, different augmented pixels of the camera sensor 420 have different numbers of gates and/or storage areas associated with the gates.

The detector 515 represents a photo-sensitive area of the augmented pixel 510. The detector 515 in-couples, e.g., through an aperture, photons of incident light and transforms the captured photons into electrons (charge). An appropriate electric field generated at a specific time interval, e.g., based on an activation pattern, guides the charge from the detector 515 to a local storage location associated with a specific gate, e.g., the gate 520A, 520B, or 520C or to a ground that may be coupled to the gate 520D.

Some or all of the gates 520A, 520B, 520C, 520D have a respective local storage location for storing a charge related to light captured by the detector 515 at a specific time interval. For example, the gates 520A, 520B, 520C may all have different respective local storage locations. Each gate 520A, 520B, 520C, 520D functions as a switch that is biased to either pass or not pass the charge collected at the detector 515 to, e.g., a local storage area associated with the gate or a drain (e.g., ground). In one embodiment, the four gates correspond to a 4-tap sensor. For example, the gates 520A of all augmented pixels 510 correspond to a first tap; similarly the gates 520B correspond to a second tap; the gates 520C correspond to a third tap; and gates 520D correspond to a fourth tap. In some embodiments, at least one of the gates 520A, 520B, 520C, 520D operates as a drain gate and does not have a local storage location, and instead drops a charge (e.g., via a ground) received from the detector 515 while active. For example, the gate 520D may be implemented as a drain. In these embodiments, the four gates may correspond to a 3-tap sensor, wherein three gates 520A, 520B, and 520C correspond to the three taps with 520D operating as a drain. Implementing a drain allows for clearing the charge on the detector 515, e.g., in instances where none of the taps are activated.

The respective local storage location of each gate 520A, 520B, 520C may be implemented as an analog electron storage area (e.g., a capacitor) for storing an analog charge generated from the light captured by the detector 515. In some embodiments, the respective local storage location of each gate 520A, 520B, 520C may be coupled to an analog-to-digital converter for converting the analog charge into digital information (i.e., a digital value quantifying an amount of analog charge). Note that in a single augmented pixel 510 there is a plurality of local storage locations that are each associated with a respective gate, and the local storage locations are all local to the single augmented pixel 510 and do not belong to any other augmented pixels 510. Thus, the local storage locations are associated with the particular augmented pixel 510, and they do not represent e.g., a memory bank separate from the camera sensor 420.

Figure 6A:
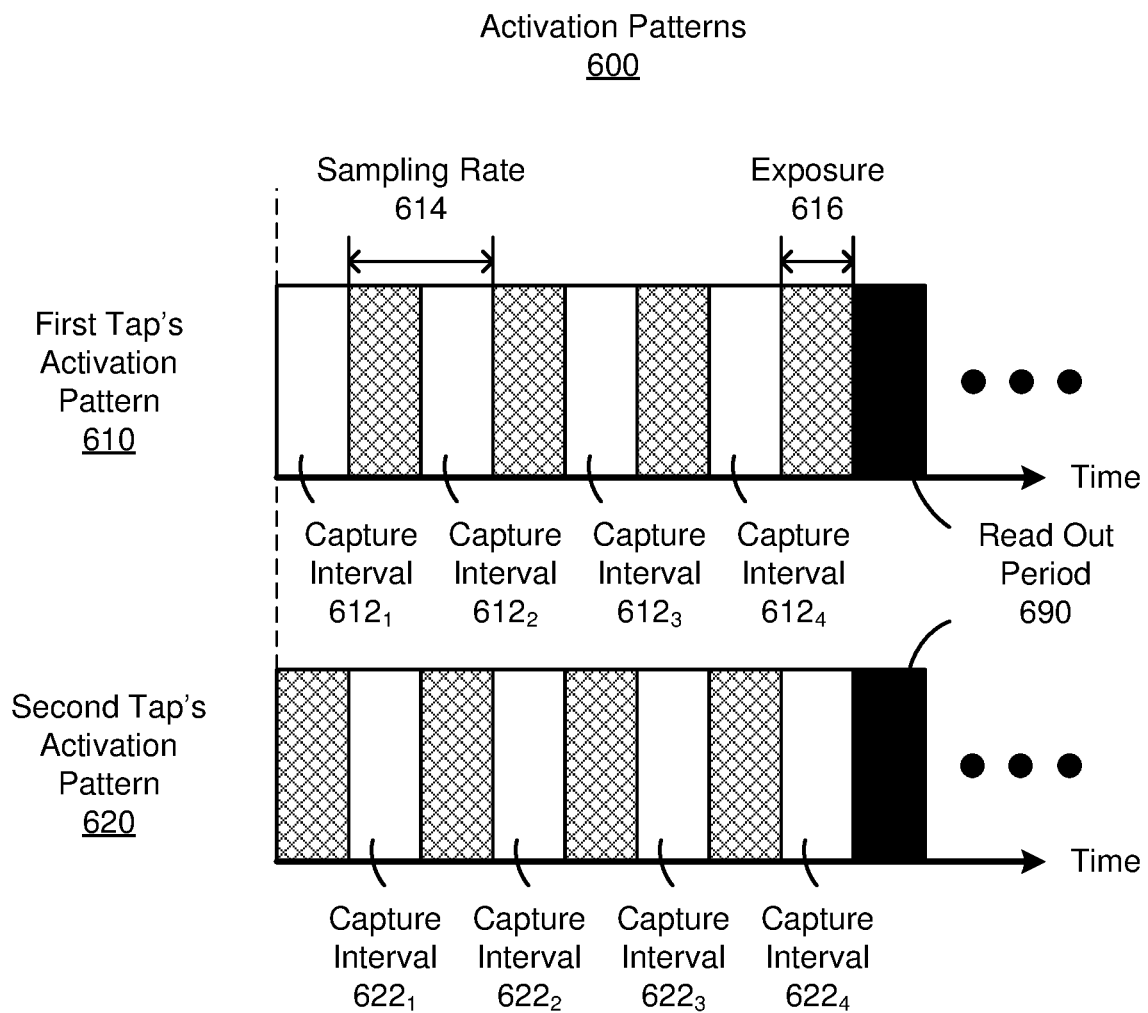
FIG. 6A is a time series of activation patterns for two taps of a camera sensor, in accordance with one or more embodiments.

FIG. 6A is a time series 600 of activation patterns for two taps of a camera sensor, in accordance with one or more embodiments. The time series 600 shows a first tap's activation pattern 610 and a second tap's activation pattern 620 which may be implemented in the camera sensor 420. The activation patterns, as described above, include multiple capture intervals dispersed over a period of time. With three or more capture intervals, the activation pattern may uniformly disperse the capture intervals such that the start of adjacent capture intervals are consistent. The uniform dispersion yields a sampling rate 614 for both the first tap's activation pattern 610 and the second tap's activation pattern 620. The sampling rate 614 is defined by the inverse of time between the starts of two adjacent capture intervals. The sampling rate 614 is smaller than (e.g., a half of) the target frame rate to be achieved by the camera 400. Also, the first activation pattern 610 and the second activation pattern 620 are complements and also align together. Note, as complements, as a capture interval of one tap ends, another capture interval of another tap begins, until a read out period 690.

The first tap's activation pattern 610 includes four capture intervals $612_1$, $612_2$, $612_3$, and $612_4$. The second tap's activation pattern 620 includes four capture intervals $622_1$, $622_2$, $622_3$, and $622_4$. Each capture interval 612 and 622 is of equal exposure length 616. Likewise both activation patterns have the same sampling rate 614 that is half of the target frame rate. As shown, when both activation patterns are completed, the controller 430 (or the encoding module 440) reads out stored image data by the first tap and the second tap during the read out period 690. In some embodiments, the tap activation patterns can be offset from one another such that light detected by the detector can be stored by one tap while the coded exposure image of another tap is read out. Once each tap is read out, the camera sensor 420 can repeat the activation patterns to gather additional image data to record longer high frame rate videos and repetitively read out local image data stored by each tap during the activation patterns.

Figure 6B:
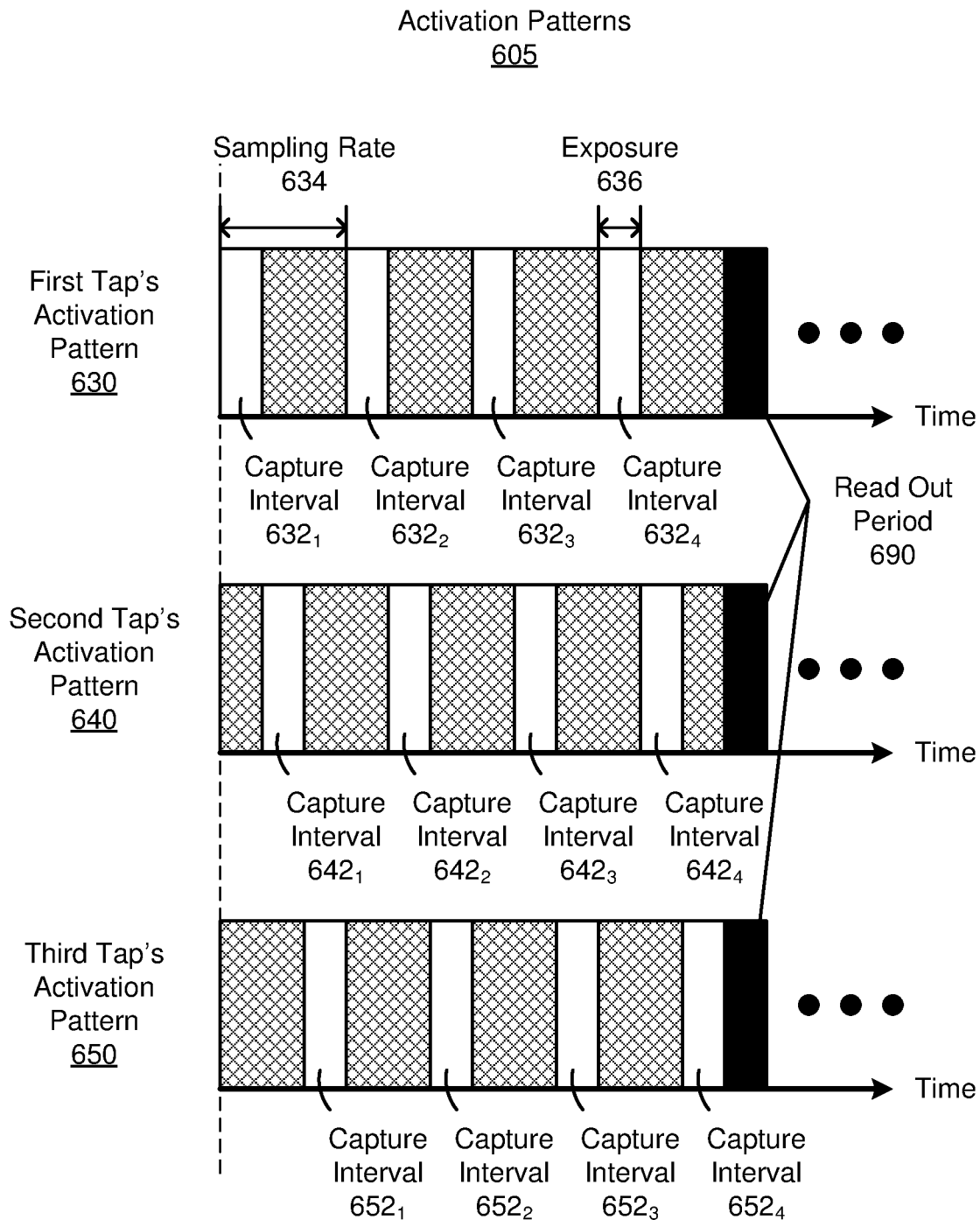
FIG. 6B is a time series of activation patterns for three taps of a camera sensor, in accordance with one or more embodiments.

FIG. 6B is a time series 605 of activation patterns for three taps of a camera sensor, in accordance with one or more embodiments. The time series 605 showing a first tap's activation pattern 630, a second tap's activation pattern 640, and a third tap's activation pattern 650 may be implemented in the camera sensor 420 with three or more taps. The activation patterns are complements and also align together. Note, as complements, as a capture interval of one tap ends, another capture interval of another tap begins, until the read out period 690. For example, as capture interval $632_1$ of the first tap's activation pattern 630 ends, capture interval $642_1$ of second tap's activation pattern 640 begins. And as capture interval $642_1$ ends, capture interval $652_1$ of third tap's activation pattern 650 begins. The activation patterns have an equivalent sampling rate 634, defined by the inverse of time between the starts of two adjacent capture intervals (shown as between capture intervals $632_1$ and $632_2$). The sampling rate 634 is smaller than (e.g., a third of) the target frame rate to be achieved by the camera 400. The first tap's activation pattern 630 includes four capture intervals $632_1$, $632_2$, $632_3$, and $632_4$. The second tap's activation pattern 640 includes four capture intervals $642_1$, $642_2$, $642_3$, and $642_4$. The third tap's activation pattern 650 includes four capture intervals $652_1$, $652_2$, $652_3$, and $652_4$. Upon completion of the activation patterns, the controller 430 (or the encoding module 440) reads out the image data as three coded exposure images during the read out period 690, one for each of the three taps.

Figure 7:
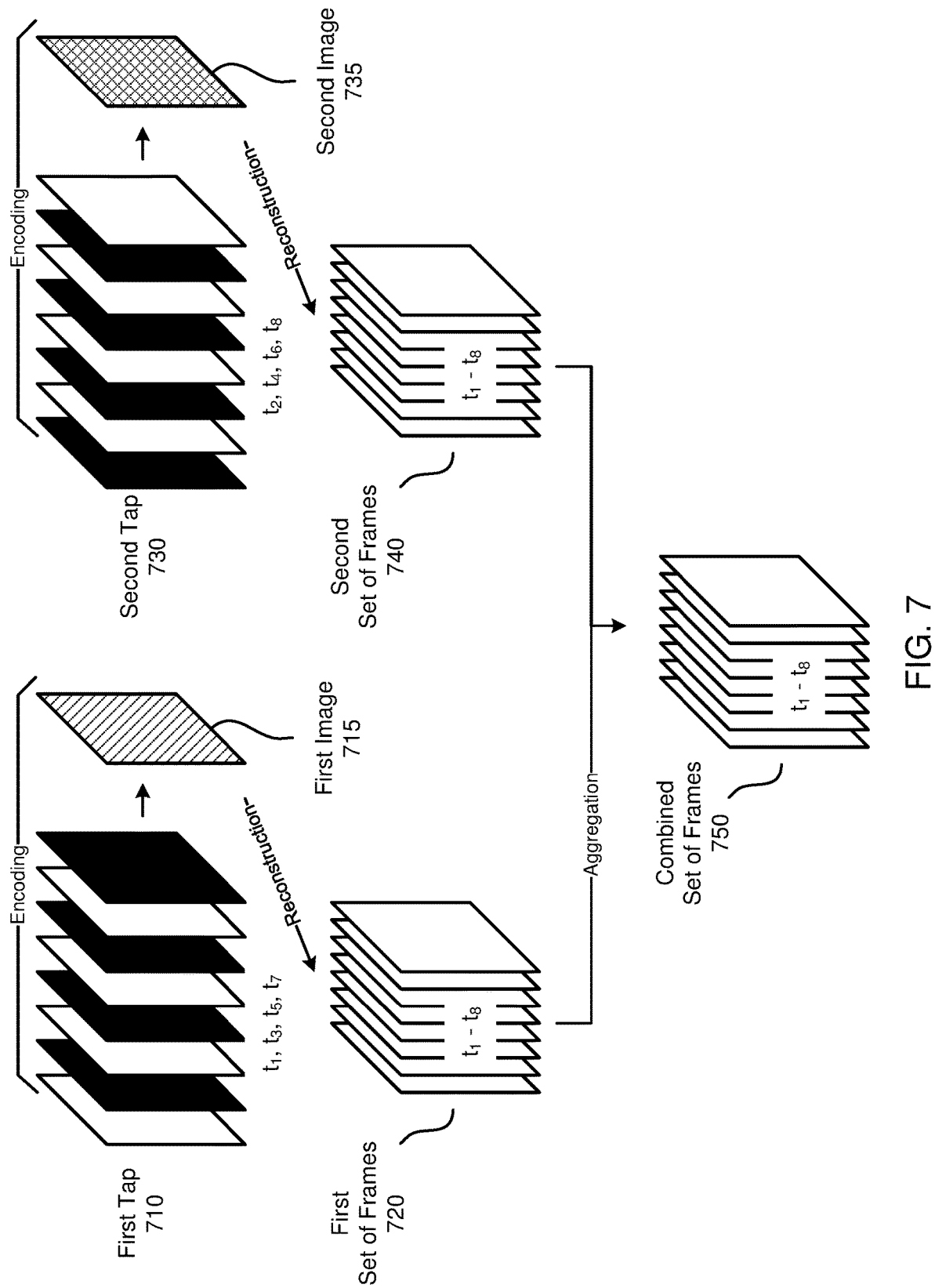
FIG. 7 is a graphic flowchart illustrating generation of high frame rate content with reconstruction of images into the target frame rate, in accordance with one or more embodiments.

FIG. 7 is a graphic flowchart illustrating generation of high frame rate content with reconstruction of images into the target frame rate, in accordance with one or more embodiments. The camera 400 may perform some or all of what is described in FIG. 7. In this illustrative flowchart, two taps are implemented, a first tap 710 and a second tap 730. As illustrated, the activation patterns for the first tap 710 and the second tap 730 are divided into eight intervals (or timestamps), $t_1$-$t_8$. With eight intervals, the target frame rate of the camera 400 is the inverse of one of the intervals. The first activation pattern for the first tap 710 alternates between on and off for the eight intervals, wherein on refers to a capture interval with off referring to a no-capture interval. The first activation pattern has a sampling frame rate of half of the target frame rate. This is similar to the first tap activation pattern 610 of FIG. 6A. The second activation pattern for the second tap 730 alternates between off and on for the eight intervals, similar to the second tap activation pattern 620 of FIG. 6A. The second activation pattern also has a sampling rate of half of the target frame rate.

The camera sensor 420 stores image data for each tap corresponding to its activation pattern. For the first tap 710, the camera sensor 420 stores image data from light detected by the augmented pixels at first gates (and their respective local storage locations) of the first tap 710 during each capture interval for the first tap 710, $t_1$, $t_3$, $t_5$, and $t_7$. Similarly, for the second tap 730, the camera sensor 420 stores image data from light detected by the augmented pixels at the second gates of the second tap 730 during each capture interval for the second tap 730, $t_2$, $t_4$, $t_6$, and $t_8$.

The controller 430 (e.g., in particular, the encoding module 440) reads out the image data stored by the respective local storage locations. The controller 430 generates a first image 715 corresponding to image data stored by the respective local storage locations of the first gates of the first tap 710. The first image 715 is a coded exposure according to the capture intervals in the first activation pattern for the first tap 710. The second image 735 is also a coded exposure according to the capture intervals in the second activation pattern for the second tap 730. The controller 430 may store the coded exposure images (e.g., in the data store 560) or may transmit the coded exposure images to an external system at a reduced bandwidth compared to the high frame rate video.

The controller 430 (e.g., in particular, the extraction module 450) reconstructs a set of image frames for each coded exposure image. The controller 430 applies a reconstruction algorithm to each coded exposure image to extract a set of image frames, a first set of image frames 720 is extracted from the first image 715 and a second set of image frames 740 is extracted from the second image 735. Both sets of image frames 720 and 740 include frames for time timestamps $t_1$-$t_8$, corresponding to the time intervals in the activation pattern, i.e., at the target frame rate. Alternatively, each set of image frames may include some number of frames less than the target frame rate. For example, the first set of image frames 720 may include frames for $t_1$, $t_3$, $t_5$, and $t_7$, while the second set of image frames 740 may include frames for $t_2$, $t_4$, $t_6$, and $t_8$. In other embodiments, another external system performs the reconstruction.

The controller 430 (e.g., in particular, the extraction module 450) aggregates the sets of image frames to generate the combined set of image frames 750. The controller 430 may aggregate the set of image frames by summing, averaging, another combinative calculation, etc. The result is a combined set of image frames 750 for time intervals $t_1$-$t_8$, at a target frame rate which is the inverse of a capture interval. As with the reconstruction, other embodiments have an external system performing the aggregation into the combined set of image frames 750.

Figure 8A:
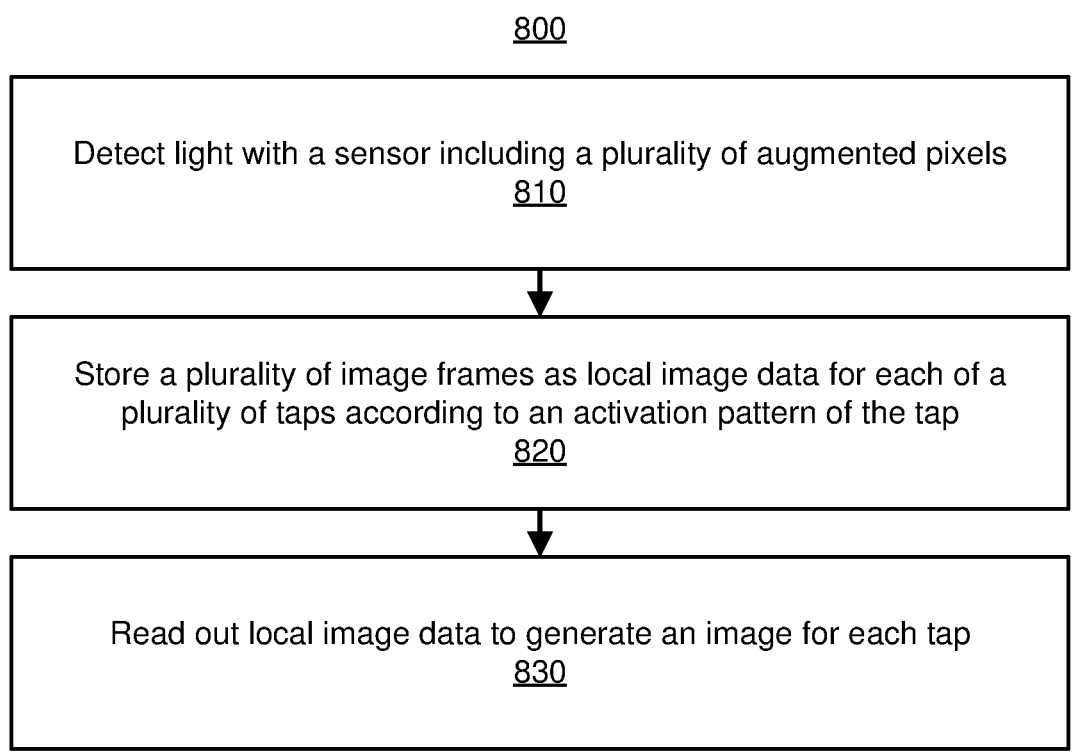
FIG. 8A is a flowchart illustrating a process for capturing coded exposure images with a N-tap camera sensor, in accordance with one or more embodiments.

FIG. 8A is a flowchart illustrating a process 800 for capturing coded exposure images with a N-tap camera sensor, in accordance with one or more embodiments. The process 800 shown in FIG. 8A is described in the perspective of the camera 400. Embodiments may include different and/or additional steps or have varying order to the steps.

The camera 400 detects 810 light with a camera sensor 420 including a plurality of augmented pixels. The camera sensor 420 comprises a plurality of augmented pixels (e.g., the augmented pixel 510). Each augmented pixel comprises a detector and a plurality of gates corresponding to a plurality of taps.

The camera 400 stores 820 a plurality of image frames as local image data for each of the multiple taps according to an activation pattern of the tap. Each augmented pixel has a gate for each tap. For example, with four taps, each augmented pixel has at least four gates, one gate included in each tap. As light is detected on the detector of the augmented pixel, the camera 400 (e.g., specifically the camera sensor 420) stores the light in respective storage locations of the gates according to the activation pattern of the taps. The gates operate as an electronic shutter which may be biased to direct or to not direct the detected light to the respective storage locations. The stored local image data at a respective storage location is additive until read out by the controller 430. As such, throughout an activation pattern and before a read out period, each capture interval of the activation pattern corresponds to an image frame of light detected by the detector. In embodiments with at least two taps, the camera 400 stores a first plurality of image frames as first local image data in the first respective local storage locations of the augmented pixels according to a first activation pattern and a second plurality of image frames as second local image data in the second respective local storage locations of the augmented pixels according to a second activation pattern.

The camera 400 reads out 830 local image data to generate an image for each tap. Upon completion of capturing image data with the taps according to their activation patterns, the camera 400 (e.g., specifically the encoding module 440 of the controller 430) reads out the stored local image data at the respective local storage locations for the augmented pixels. Local image data at the respective local storage locations for gates included in one tap is read out to generate an image for the tap. For example, for a first tap, the camera 400 reads out image data stored by all respective storage locations associated with first gates corresponding to the first tap. The result is a coded exposure image for the each tap, achieving multiple coded exposure images equal to the number of taps.

Figure 8B:
FIG. 8B is a flowchart illustrating a process for extracting high frame rate video with coded exposure images from a N-tap camera sensor, in accordance with one or more embodiments.

FIG. 8B is a flowchart illustrating a process 805 for extracting high frame rate video with coded exposure images from a N-tap camera sensor, in accordance with one or more embodiments. The process 805 shown in FIG. 8B is described in the perspective of the camera 400, particularly the controller 430. Embodiments may include different and/or additional steps or have varying order to the steps. In other embodiments, some or all of the process 805 is performed by an external system.

The camera 400 reconstructs 850 a sets of image frames at a target frame rate by applying a reconstruction algorithm to each image generated from the plurality of taps. The camera 400 applies a reconstruction algorithm to each coded exposure image to extract a set of image frames. The reconstruction algorithm considers the activation pattern used to capture the coded exposure image. The numerous reconstruction algorithms that may be implemented are described above in FIG. 4. After extracting a set of image frames from each coded exposure image, the result is a plurality of sets of image frames equal to the number of taps. Each set of image frames is at the target frame rate.

The camera 400 generates 860 a combined set of image frames at the target frame rate by aggregating the sets of image frames. The camera 400 aggregates the sets of image frames to generate the combined set of image frames 750. The controller 430 may aggregate the set of image frames by adding, averaging, or another combinative calculation.

The camera 400 may iterate through the process 800. The more iterations of the process 800, the longer a high frame rate video can be reconstructed. For example, the activation patterns of the taps are 10 ms long meaning one iteration of the process 800 can reconstruct a high frame rate video in real-time spanning approximately 10 ms at 1,000 fps. To capture 2 seconds worth of high frame rate video, assuming similar activation patterns, the camera 400 may iterate through the process 800 a total of 200 times. The result would be 200 instances of read out coded exposure images for each tap. So in a 3-tap case, the result would be 200 triplets of coded exposure images. Note, the 200 triplets of coded exposure images may be used to achieve ~2,000 image frames at 100 fps for the 2 seconds of video.

The camera 400 may also iterate through the process 805. As described above, the more iterations of the process 805, the longer a high frame rate video can be reconstructed. The camera 400 reconstructs and combines according to coded exposure images read out together. The camera 400 aggregates the combined sets of image frames to form the high frame rate video spanning a greater length than the activation patterns used to capture the coded exposure images. Continuing with the example in FIG. 8A, suppose the camera 400 captured 200 triplets of coded exposure images corresponding to 200 iterations of the process 800. The camera 400 iterates through the process 805 for each triplet of coded exposure images. The combined set of image frames from all triplets may be aggregated to achieve the ~2,000 image frames at 1,000 fps for the 2 seconds of video.

Figure 9:
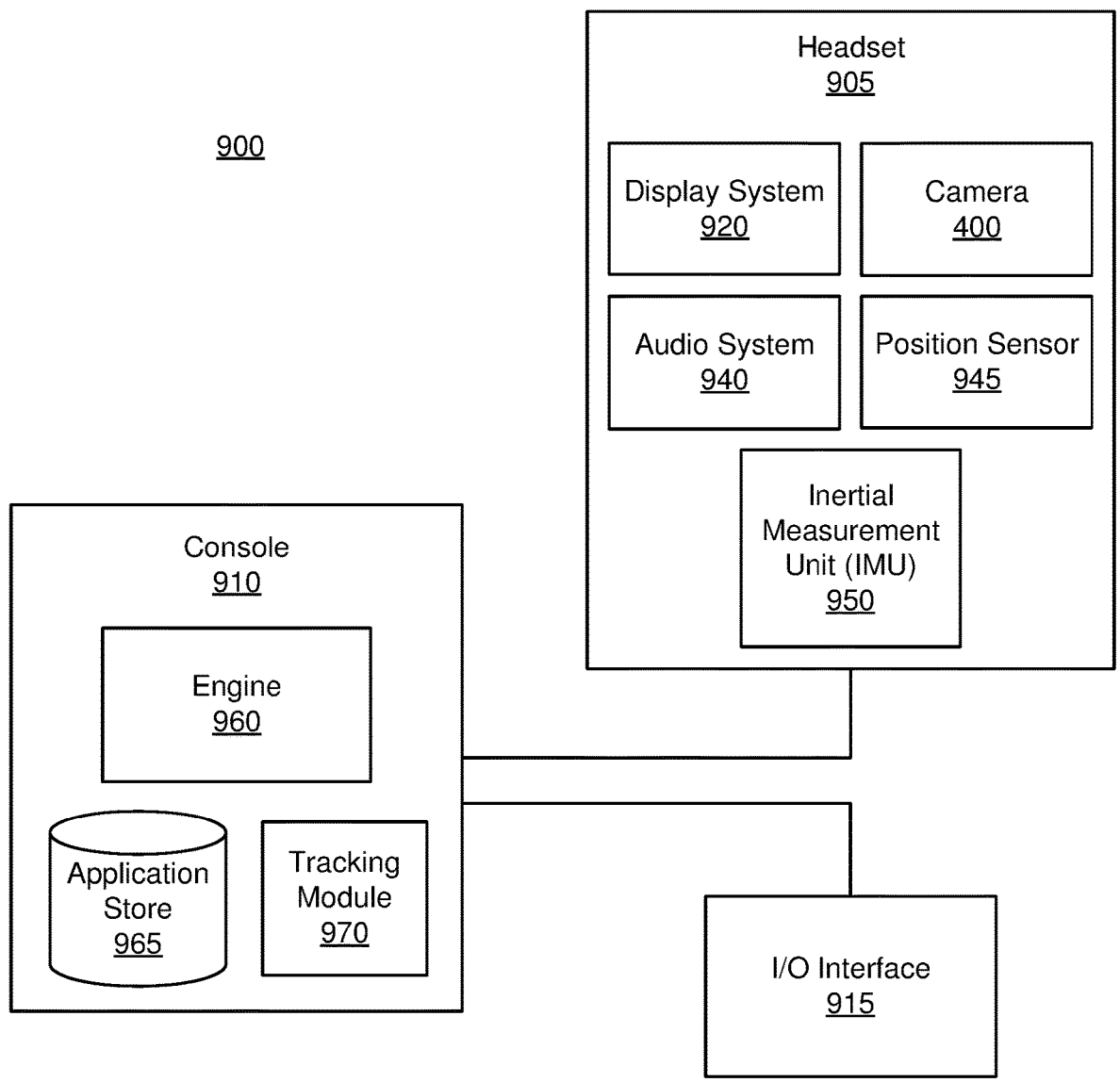
FIG. 9 is an artificial reality system environment that includes a headset, in accordance with one or more embodiments.

FIG. 9 is a system environment of an artificial reality system 900 including a headset, in accordance with one or more embodiments. The system 900 may operate in an artificial reality context, e.g., a virtual reality, an augmented reality, a mixed reality context, or some combination thereof. The system 900 shown by FIG. 9 comprises a headset 905 and may additionally include another input/output (I/O) interface 915 that may be coupled to a console 910. The headset 200 is one embodiment of the headset 905. While FIG. 9 shows an example system 900 including one headset 905, in other embodiments, any number of additional components may be included in the system 900. In alternative configurations, different and/or additional components may be included in the system 900. Additionally, functionality described in conjunction with one or more of the components shown in FIG. 9 may be distributed among the components in a different manner than described in conjunction with FIG. 9 in some embodiments. For example, some or all of the functionality of the console 910 may be integrated into the headset 905.

The headset 905 presents content to a user. The headset 905 may be an eyewear device, a head-mounted display, an earbud, a headphone, or another type of device placed on a head. In some embodiments, the presented content includes audio content via an audio system 940, visual content via a display system 920, haptic feedback from one or more haptic feedback devices (not shown in FIG. 9), etc. In some embodiments, the headset 905 presents virtual content to the user that is based in part on depth information of a real local area surrounding the headset 905. For example, the user wearing the headset 905 may be physically in a room, and virtual walls and a virtual floor corresponding to walls and floor in the room are rendered as part of the virtual content presented by the headset 905. In another example, a virtual character or a virtual scene may be rendered as an augmentation to views of the real world through the headset 905.

The headset 905 includes a display system 920, a camera 400, an audio system 940, position sensor 945, and an inertial measurement Unit (IMU) 950. Some embodiments of the headset 905 have different components than those described in conjunction with FIG. 9. Additionally, the functionality provided by various components described in conjunction with FIG. 9 may be differently distributed among the components of the headset 905 in other embodiments, or be captured in separate assemblies remote from the headset 905. In one or more examples, the headset 905 includes an eye-tracking system, a haptic feedback system, one or more light sources (e.g., for structured illumination light), etc.

The display system 920 presents visual content to a user of the headset 905. The visual content presented may include image data taken by the camera 400. The visual content may also take into account depth information determined by the camera 400. The display system 920 may comprise an electronic display and an optics block. The electronic display displays 2D or 3D images to the user in accordance with data received from the console 910. In various embodiments, the electronic display comprises a single electronic display or multiple electronic displays (e.g., a display for each eye of a user). Examples of the electronic display include: a liquid crystal display (LCD), an organic light emitting diode (OLED) display, an active-matrix organic light-emitting diode display (AMOLED), a waveguide display, some other display, or some combination thereof. The display systems 110, 110, and 310 are embodiments of the display system 920.

The optics block magnifies image light received from the electronic display, corrects optical errors associated with the image light, and presents the corrected image light to a user of the headset 905. In various embodiments, the optics block includes one or more optical elements. Example optical elements included in the optics block include: a waveguide, an aperture, a Fresnel lens, a convex lens, a concave lens, a filter, a reflecting surface, or any other suitable optical element that affects image light. Moreover, the optics block may include combinations of different optical elements. In some embodiments, one or more of the optical elements in the optics block may have one or more coatings, such as partially reflective or anti-reflective coatings.

Magnification and focusing of the image light by the optics block allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block corrects the distortion when it receives image light from the electronic display generated based on the content.

The camera 400 captures image data of a local area around the headset 905. The camera 400 captures image data of an environment of the headset 905. The image data of the environment may include images, coded exposure images, video, etc. The camera 400 comprises at least the optics block 410, the camera sensor 420, and the controller 430. The camera sensor 420 comprises a plurality of augmented pixels, wherein each augmented pixel has a detector and a number of gates. The camera sensor 420 may be implemented as an N-tap camera sensor. Each tap corresponds to one gate of each augmented pixel. The camera sensor includes at least two taps, wherein the gates corresponding to either of the taps have a respective local storage location.

According to this present disclosure, the camera 400 is configured to capture coded exposure images, that may be used to reconstruct high frame rate video. The camera 400 captures a first coded exposure image with the first tap according to a first activation pattern and a second coded exposure image with the second tap according to a second activation pattern (and additional coded exposure images with additional taps according to their own respective activation patterns). The camera 400 and/or an external system reconstructs a set of image frames by applying a reconstruction algorithm to each coded exposure. The sets of image frames corresponding to the same time interval may be combined to form a combined set of image frames. One or more combined sets may be stitched together to constitute the high frame rate video. The high frame rate video may be presented on the headset 905, or may otherwise be provided to other components and/or external systems.

The camera 400 may also be configured to determine depth information of an environment around the headset 905. The depth information may include a depth map of the environment at an instant of time. The camera 400 (e.g., with additional cameras) captures images of the environment. With the captured images, the camera 400 can use any of numerous imaging analysis techniques to determine correspondences between the captured images which may be used for depth estimation. In other embodiments, the camera 400 assesses other data received by other components of the headset 905 to determine depth information, e.g., movement. For example, the headset 905 may include proximity sensors that can be also be used alone or in conjunction with the captured images to determine depth information. The depth information determined by the camera 400 may be used to improve content presented by the headset 905. In some embodiments, the headset 905 has one or more illuminators 130. Spatially uniform temporally pulsed and synced illumination provides depth information encoded in the time of flight. Spatially structured illumination (either pulsed or continuous) provides depth information encoded in the distortion of the structured illumination pattern on the objects/scene.

The audio system 940 provides audio content to a user of the headset 905. The audio system 940 may comprise one or acoustic sensors, one or more transducers, and an audio controller. The audio system 940 may provide spatialized audio content to the user. In some embodiments, the audio system 940 may request acoustic parameters from the console 910. The acoustic parameters describe one or more acoustic properties (e.g., room impulse response, a reverberation time, a reverberation level, etc.) of the local area. The audio system 940 may provide information describing at least a portion of the local area from e.g., the camera 400 and/or location information for the headset 905 from the position sensor 945. The audio system 940 may generate one or more sound filters using one or more of the acoustic parameters, and use the sound filters to provide audio content to the user.

The IMU 950 is an electronic device that generates data indicating a position of the headset 905 based on measurement signals received from one or more of the position sensor 945. A position sensor 945 generates one or more measurement signals in response to motion of the headset 905. Examples of position sensor 945 include: one or more accelerometers, one or more gyroscopes, one or more magnetometers, another suitable type of sensor that detects motion, a type of sensor used for error correction of the IMU 950, or some combination thereof. The position sensor 945 may be located external to the IMU 950, internal to the IMU 950, or some combination thereof.

Based on the one or more measurement signals from one or more position sensor 945, the IMU 950 generates head-tracking data indicating an estimated current position of the headset 905 relative to an initial position of the headset 905. For example, the position sensor 945 include multiple accelerometers to measure translational motion (forward/back, up/down, left/right) and multiple gyroscopes to measure rotational motion (e.g., pitch, yaw, and roll). In some embodiments, the IMU 950 rapidly samples the measurement signals and calculates the estimated current position of the headset 905 from the sampled data. For example, the IMU 950 integrates the measurement signals received from the accelerometers over time to estimate a velocity vector and integrates the velocity vector over time to determine an estimated current position of a reference point on the headset 905. Alternatively, the IMU 950 provides the sampled measurement signals to the console 910, which interprets the head-tracking data to reduce error. The reference point is a point that may be used to describe the position of the headset 905. The reference point may generally be defined as a point in space or a position related to the headset's 905 orientation and position.

The console 910 provides content to the headset 905 for processing in accordance with information received from the headset 905. In the example shown in FIG. 9, the console 910 includes an application store 965, a tracking module 970, and an engine 960. Some embodiments of the console 910 have different modules or components than those described in conjunction with FIG. 9. Similarly, the functions further described below may be distributed among components of the console 910 in a different manner than described in conjunction with FIG. 9.

The application store 965 stores one or more applications for execution by the console 910. An application is a group of instructions that, when executed by a processor, generates content for presentation to the user. Content generated by an application may be in response to inputs received from the user via movement of the headset 905 or any input/output devices. Examples of applications include: gaming applications, conferencing applications, video playback applications, or other suitable applications.

The tracking module 970 calibrates the system environment using one or more calibration parameters and may adjust one or more calibration parameters to reduce error in determination of the position of the headset 905. Calibration performed by the tracking module 970 also accounts for information received from the IMU 950 in the headset 905. Additionally, if tracking of the headset 905 is lost, the tracking module 970 may re-calibrate some or all of the system environment.

The tracking module 970 tracks movements of the headset 905 as head-tracking data using information from the one or more position sensor 945, the IMU 950, or some combination thereof. For example, the tracking module 970 determines a position of a reference point of the headset 905 in a mapping of a local area based on information from the headset 905. Additionally, in some embodiments, the tracking module 970 may use portions of information to predict a future position of the headset 905. The tracking module 970 provides the head-tracking data inclusive of the estimated and/or predicted future position of the headset 905 to the engine 960.

The engine 960 also executes applications within the system environment and receives depth information from the camera 400, position information, acceleration information, velocity information, predicted future positions, or some combination thereof, of the headset 905 from the tracking module 970. Based on the received information, the engine 960 determines content to provide to the headset 905 for presentation to the user. For example, if the received information indicates that the user has looked to the left, the engine 960 generates content for the headset 905 that mirrors the user's movement in a virtual environment or in an environment augmenting the local area with additional content. Additionally, the engine 960 performs an action within an application executing on the console 910, in response to any inputs received from headset 905, and provides feedback to the user that the action was performed. The provided feedback may be visual via the headset 905. In response, the engine 960 may perform one or more of the actions in the command and/or generate subsequent content to be provided to the headset 905 based on the commands.

The I/O interface 915 is a device that allows a user to send action requests and receive responses from the console 910. An action request is a request to perform a particular action. For example, an action request may be an instruction to start or end capture of image or video data, or an instruction to perform a particular action within an application. The I/O interface 915 may include one or more input devices. Example input devices include: a keyboard, a mouse, a game controller, or any other suitable device for receiving action requests and communicating the action requests to the console 910. An action request received by the I/O interface 915 is communicated to the console 910, which performs an action corresponding to the action request. In some embodiments, the I/O interface 910 includes an IMU that captures calibration data indicating an estimated position of the I/O interface 915 relative to an initial position of the I/O interface 915. In some embodiments, the I/O interface 915 may provide haptic feedback to the user in accordance with instructions received from the console 910. For example, haptic feedback is provided when an action request is received, or the console 910 communicates instructions to the I/O interface 915 causing the I/O interface 915 to generate haptic feedback when the console 910 performs an action.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A camera comprising:
    a sensor configured to image a local area at a target frame rate, the sensor including a plurality of augmented pixels, each augmented pixel comprising:
        a first gate comprising a first respective local storage location, the first gate configured to store a first plurality of image frames as first local image data in the first respective local storage location according to a first activation pattern, and
        a second gate comprising a second respective local storage location, the second gate configured to store a second plurality of image frames as second local image data in the second respective local storage location according to a second activation pattern different from the first activation pattern; and
    a controller configured to:
        read out local image data stored in the respective local storage locations of each augmented pixel to generate a first image using the first image data and a second image using the second image data,
        wherein a combined set of image frames at the target frame rate is extracted from the first image and the second image using a reconstruction algorithm, the first activation pattern, and the second activation pattern.

2. The camera of claim 1, wherein each augmented pixel further comprises:
    a third gate comprising a third respective local storage location, the third gate configured to store a third plurality of image frames as third local image data in the third respective local storage location according to a third activation pattern different from the first activation pattern and the second activation pattern,
    wherein the controller is further configured to read out local image data to generate a third image using the third image data, and
    wherein the combined set of image frames at the target frame is extracted from the first image, the second image, and the third image using the reconstruction algorithm, the first activation pattern, the second activation pattern, and the third activation pattern.

3. The camera of claim 1, wherein the first activation pattern has a first sampling frame rate and the second activation pattern has a second sampling frame rate, wherein the first sampling frame rate and the second sampling frame rate are smaller than the target frame rate.

4. The camera of claim 3, wherein the first sampling frame rate is equal to the second sampling frame rate.

5. The camera of claim 1, wherein the first activation pattern complements the second activation pattern.

6. The camera of claim 1, wherein the first activation pattern comprises pseudo-randomly dispersed capture intervals.

7. The camera of claim 1, wherein the controller is further configured to generate the combined set of image frames by applying the reconstruction algorithm to the first image and the second image.

8. The camera of claim 1, wherein an external processor is configured to generate the combined set of image frames by applying the reconstruction algorithm to the first image and the second image.

9. The camera of claim 1, wherein a first set of image frames at the target frame rate is reconstructed by applying a reconstruction algorithm to the first image according to the first activation pattern, wherein a second set of image frames at the target frame rate is reconstructed by applying the reconstruction algorithm to the second image according to the second activation pattern, and wherein the combined set of image frames at the target frame rate is generated by combining the first set of image frames and the second set of image frames.

10. The camera of claim 9, wherein the combined set of image frames averages the first set of image frames and the second set of image frames.

11. The camera of claim 1, wherein the reconstruction algorithm implements a compressed sensing algorithm.

12. The camera of claim 1, wherein a convolutional neural network implements the reconstruction algorithm.

13. A method comprising:
    detecting light with a sensor including a plurality of augmented pixels, wherein each augmented pixel comprises a first gate having a first respective local storage location and a second gate having a second respective local storage location;
    storing a first plurality of image frames as first local image data in the first respective local storage locations of the augmented pixels according to a first activation pattern and a second plurality of image frames as second local image data in the second respective local storage locations of the augmented pixels according to a second activation pattern; and
    reading out local image data stored in the respective storage locations of the augmented pixels to generate a first image using the first image data and a second image using the second image data,
    wherein a combined set of image frames at a target frame rate is extracted from the first image and the second image using a reconstruction algorithm, the first activation pattern, and the second activation pattern.

14. The method of claim 13, wherein the first activation pattern has a first sampling frame rate and the second activation pattern has a second sampling frame rate, wherein the first sampling frame rate and the second sampling frame rate are smaller than the target frame rate.

15. The method of claim 14, wherein the first sampling frame rate is equal to the second sampling frame rate.

16. The method of claim 13, wherein the first activation pattern complements the second activation pattern.

17. The method of claim 13, wherein the first activation pattern comprises pseudo-randomly dispersed capture intervals.

18. A method comprising:
    reconstructing a first set of image frames at a target frame rate by applying a reconstruction algorithm to a first image generated with first image data stored in first respective local storage locations of augmented pixels of a sensor;
    reconstructing a second set of image frames at the target frame rate by applying the reconstruction algorithm to a second image generated with second image data stored in second respective local storage locations of the augmented pixels of the sensor; and
    generating a combined set of image frames at the target frame rate by aggregating the first set of image frames and the second set of image frames.

19. The method of claim 18, wherein aggregating the first set of image frames and the second set of image frames comprises, for each timestamp, averaging an image frame at the timestamp from the first set and an image frame at the timestamp from the second set.

20. The method of claim 18, wherein the reconstruction algorithm implements a compressed sensing algorithm and a convolutional neural network.

* * * * *